(12) United States Patent
Ke

(10) Patent No.: US 12,237,583 B2
(45) Date of Patent: Feb. 25, 2025

(54) ANTENNA MODULE AND COMMUNICATION DEVICE HAVING THE ANTENNA MODULE, AND COMMUNICATION SYSTEM

(71) Applicant: TP-LINK CORPORATION LIMITED, Hong Kong (CN)

(72) Inventor: Zhihui Ke, Hong Kong (HK)

(73) Assignee: TP-LINK CORPORATION LIMITED, Hong Kong (CN)

( * ) Notice: Subject to any disclaimer, the term of this patent is extended or adjusted under 35 U.S.C. 154(b) by 0 days.

(21) Appl. No.: 18/603,511

(22) Filed: Mar. 13, 2024

(65) Prior Publication Data

US 2024/0222861 A1    Jul. 4, 2024

Related U.S. Application Data

(63) Continuation of application No. PCT/CN2022/118476, filed on Sep. 13, 2022.

(30) Foreign Application Priority Data

Sep. 13, 2021  (CN) .......................... 202111071908.8

(51) Int. Cl.
  *H01Q 3/02* (2006.01)
  *H01Q 1/12* (2006.01)
  *H01Q 3/04* (2006.01)

(52) U.S. Cl.
  CPC .............. *H01Q 3/04* (2013.01); *H01Q 1/125* (2013.01)

(58) Field of Classification Search
  CPC .......... H01Q 1/12; H01Q 1/125; H01Q 1/24; H01Q 3/00; H01Q 3/02; H01Q 3/04; H01Q 3/08; H04B 7/06; H04B 7/10
  See application file for complete search history.

(56) References Cited

U.S. PATENT DOCUMENTS 8,184,601 B2 * 5/2012 Abramov ................. H01Q 3/24
                                               370/328
8,504,063 B2 * 8/2013 Ekbatani ............... H04W 76/14
                                               455/63.4

(Continued)

FOREIGN PATENT DOCUMENTS

CN    106602226 A    4/2017
CN    110495107 A    11/2019

(Continued)

OTHER PUBLICATIONS

Extended European Search Rerport issued in EP22866803.4, dated Dec. 16, 2024, 9 pages.

*Primary Examiner* — Tho G Phan
(74) *Attorney, Agent, or Firm* — Loeb & Loeb LLP

(57) ABSTRACT

An antenna module and a communication device having the antenna module, and a communication system are provided. The communication system includes a plurality of communication devices, where an antenna module of a first communication device determines a first target radiation azimuth corresponding to location information of a peer communication device among the plurality of communication devices, based on the location information of the peer communication device, and determines a corresponding first antenna radiation azimuth according to the first target radiation azimuth, to point to the peer communication device. The peer communication device determines a second target radiation azimuth corresponding to the location information of the first communication device, based on the location information of the first communication device, and determines a corresponding second antenna radiation azimuth according to the second target radiation azimuth, to point to the first communication device.

10 Claims, 4 Drawing Sheets

(56) References Cited

U.S. PATENT DOCUMENTS

| | | | | |
|---|---|---|---|---|
| 9,281,559 B2* | 3/2016 | Ransom | ............... | H01Q 3/005 |
| 9,319,125 B2* | 4/2016 | Choi | ............... | H04B 7/10 |
| 10,978,799 B2* | 4/2021 | Wu | ............... | H01Q 3/02 |
| 11,476,909 B2* | 10/2022 | Chen | ............... | G01S 19/01 |
| 11,817,620 B2* | 11/2023 | Zhang | ............... | H01Q 1/243 |
| 2003/0236096 A1 | 12/2003 | Yamazaki | | |
| 2014/0024320 A1 | 1/2014 | Choi | | |

FOREIGN PATENT DOCUMENTS

| | | | |
|---|---|---|---|
| CN | 113376571 A | 9/2021 | |
| CN | 214124135 U | 9/2021 | |
| CN | 113948867 A | 1/2022 | |
| JP | 2002026800 A | 1/2002 | |

* cited by examiner

ANTENNA MODULE AND COMMUNICATION DEVICE HAVING THE ANTENNA MODULE, AND COMMUNICATION SYSTEM

CROSS-REFERENCE TO RELATED APPLICATION(S)

This application is a continuation of International Patent Application No. PCT/CN2022/118476, filed on Sep. 13, 2022, which claims the priority to and benefits of Chinese patent application Ser. No. 202111071908.8, filed on Sep. 13, 2021. All the aforementioned patent applications are hereby incorporated by reference in their entireties.

TECHNICAL FIELD

The present disclosure relates to a field of antenna technology, and more particularly, to an antenna module and a communication device having the antenna module, and a communication system, based on space positioning technology.

BACKGROUND

Benefited from a relatively large physical gain of directional antennas, wireless directional communication may usually achieve better effects than ordinary omnidirectional communication. Meanwhile, due to directionality, wireless directional communication may also effectively avoid signal interference from other angular directions.

The existing wireless directional communication usually directly uses a plurality of physical directional antennas for coverage layout. However, due to its fixed radiation field and limited adaptability to different scenarios, for a client whose position changes, it is likely that the position is not located on the maximum gain radiation azimuth angle of the plurality of directional antennas. There are also some smart antennas that adjust a radiation azimuth map through signal intensity detection, but due to great real-time fluctuations of wireless signals, it is difficult to implement precise directional adjustment. There are also antenna array designs, such as adaptive antenna arrays, which adjust the radiation azimuth map according to a relative position of the client, but require additional complex antenna array designs without being decoupled from the antenna control system (the communication device), thus having high costs in both software and hardware implementations.

In addition, the directional transmission in the existing wireless directional communication is basically one-way directional transmission, mostly from the base station to the client, but not two-way or multi-way directional transmission, and thus still requires further improvement in transmission efficiency.

There is also a communication system using a point-to-point mode. Because antennas have very strong directionality, firstly, accurate alignment between the base station and the client needs to be ensured, and secondly, no arbitrary movement is allowed after alignment; otherwise, deviation of antenna directionality will affect communication quality and even cause connection failure, leading to limited flexibility, and difficulty in networking.

It should be noted that the information disclosed in the above Background section is only intended to enhance understanding of the background of the present disclosure, and therefore may include information that does not constitute the prior art known to those skilled in the art.

SUMMARY

The present disclosure provides an antenna module and a communication device having the antenna module, and a communication system, which acquires a precise position of a communication object through space positioning technology, implements precise directional angle adjustment of an antenna, and is decoupled from a control system of the antenna, to reduce design costs. In addition, by configuring an antenna module on each of a plurality of communication devices in the communication system, directional communication may be carried out between these communication devices pairwise, that is, the antenna modules of these communication devices may be automatically combined for directional communication in a plurality of directions, forming an automatic multi-way directional system.

In a first aspect, a communication system is provided by the embodiments of present invention. The communication system comprises a plurality of communication devices, in which: an antenna module of a first communication device among the plurality of communication devices in the communication system determines a first target radiation azimuth corresponding to position information of a peer communication device among the plurality of communication devices based on the position information of the peer communication device, and determines a corresponding first antenna radiation azimuth according to the first target radiation azimuth, to point to the peer communication device; and the peer communication device determines a second target radiation azimuth corresponding to the position information of the first communication device based on the position information of the first communication device, and determines a corresponding second antenna radiation azimuth according to the second target radiation azimuth, to point to the first communication device.

Optionally, a number of the first communication device is one or more, and/or a number of the peer communication device of the first communication device is one or more.

Optionally, the plurality of communication devices comprised by the communication system comprise one of: a plurality of user terminals (e.g., clients); a plurality of wireless access points; a plurality of base stations; or any combination of user terminals, wireless access points, and base stations.

Optionally, the peer communication device comprises a first peer communication device and a second peer communication device, and an antenna module of the first peer communication device and an antenna module of the second peer communication device independently determine second antenna radiation azimuths respectively pointing to the first communication device.

Optionally, when position information of at least one of the first communication device and the peer communication device is updated, the first antenna radiation azimuth pointing to the peer communication device that is determined by the antenna module of the first communication device is updated; and the second antenna radiation azimuth pointing to the first communication device that is determined by the antenna module of the peer communication device is updated.

Optionally, the antenna module of the first communication device comprises: a space positioning module, configured to determine the location information of the peer communication device in a three-dimensional coordinate system, based on positioning information acquired from the peer communication device of the first communication device; a directional adjustment algorithm module, configured to determine a target radiation azimuth corresponding to the peer communication device based on the location information of the peer communication device in the three-dimensional coordinate system, and select an antenna radiation azimuth from N radiation azimuths, based on the determined target radiation azimuth, where, N is an integer greater than or equal to 1; and a directional antenna module, comprising a directional antenna structure providing the N radiation azimuths, and configured to directionally adjust the directional antenna structure based on the antenna radiation azimuth selected by the directional adjustment algorithm module to point to the peer communication device.

Optionally, the space positioning module comprises: a space positioning antenna sub-module, comprising M positioning antennas, and configured to receive the positioning information from the peer communication device of the first communication device, where, M is an integer greater than or equal to 1; a space positioning algorithm sub-module, configured to establish the three-dimensional coordinate system with a center of the M positioning antennas as an origin, and determine a three-dimensional coordinate as location information of the peer communication device in the three-dimensional coordinate system according to the positioning information.

Optionally, wherein, when determining the antenna radiation azimuth, the directional adjustment algorithm module is configured to: convert the three-dimensional coordinate of the peer communication device in the three-dimensional coordinate system into the target radiation azimuth; compare the target radiation azimuth with the N radiation azimuths; and determine the radiation azimuth among the N radiation azimuths that is closest to the target radiation azimuth as the antenna radiation azimuth.

Optionally, the directional antenna structure comprises P antennas, and the P antennas are used to form the N radiation azimuths, where, the number P is equal or unequal to the number N.

In a second aspect, an antenna module is provided and mounted on a communication device. The antenna module comprises: a space positioning module, configured to determine location information of a peer communication device in the three-dimensional coordinate system, based on positioning information acquired from the peer communication device of the communication device; a directional adjustment algorithm module, configured to determine a target radiation azimuth corresponding to the peer communication device based on the location information of the peer communication device in the three-dimensional coordinate system, and select an antenna radiation azimuth from N radiation azimuths, based on the determined target radiation azimuth, where, N is an integer greater than or equal to 1; and a directional antenna module, comprising a directional antenna structure providing the N radiation azimuths, and configured to directionally adjust the directional antenna structure based on the antenna radiation azimuth selected by the directional adjustment algorithm module to point to the peer communication device.

Optionally, the space positioning module comprises: a space positioning antenna sub-module, comprising M positioning antennas, and configured to receive positioning information from the peer communication device of the communication device, where, M is an integer greater than or equal to 1; a space positioning algorithm sub-module, configured to establish the three-dimensional coordinate system with a center of the M positioning antennas as an origin, and determine a three-dimensional coordinate as location information of the peer communication device in the three-dimensional coordinate system according to the positioning information.

Optionally, when determining the three-dimensional coordinate, the space positioning algorithm sub-module is configured to: calculate distance information of the peer communication device relative to each positioning antenna of the antenna module according to the positioning information and phase difference information for the positioning information received by any two positioning antennas; and determine the three-dimensional coordinate of the peer communication device in the three-dimensional coordinate system according to the distance information and the phase difference information.

Optionally, the positioning information is a wireless data message with a timestamp.

Optionally, when determining the three-dimensional coordinates, the space positioning algorithm sub-module is further configured to: calculate transmission time of the positioning information according to the timestamp in the positioning information received by each positioning antenna among the M positioning antennas, and respectively calculate distance information of the peer communication device relative to each positioning antenna, in combination with the transmission speed of the positioning information; calculate phase difference information between positioning information received by any two positioning antennas, the phase difference information being associated with a position relationship of the M positioning antennas; and determine the three-dimensional coordinate of the peer communication device in the three-dimensional coordinate system according to a trigonometric function relationship, based on the distance information and the phase difference information.

Optionally, when determining the target radiation azimuth, the directional adjustment algorithm module is configured to: convert the three-dimensional coordinate of the peer communication device in the three-dimensional coordinate system into the target radiation azimuth; compare the target radiation azimuth with the N radiation azimuths; and determine the radiation azimuth among the N radiation azimuths that is closest to the target radiation azimuth as the antenna radiation azimuth.

Optionally, the three-dimensional coordinate is in a form of point coordinates; and the target radiation azimuth and the N radiation azimuths are in a form of angle coordinate.

Optionally, the directional adjustment algorithm module is further configured to: pre-divide the three-dimensional coordinate system into the N radiation azimuths in the form of angle coordinate, according to the directional antenna structure comprised by the directional antenna module.

Optionally, the directional antenna structure comprises P antennas, and the P antennas are used to form the N radiation azimuths, where, the number P is equal or unequal to the number N.

In a third aspect, a communication device is provided, where the communication device comprises an antenna module according to the second aspect.

In a fourth aspect, a communication method of the communication system according to the first aspect is provided, the method comprising: determining, by an antenna module of a first communication device among a plurality of communication devices in the communication system, a first target radiation azimuth corresponding to location information of a peer communication device among the plurality of communication devices based on the location information of the peer communication device, and determining a corresponding first antenna radiation azimuth according to the first target radiation azimuth, to point to the peer communication device; and determining, by the peer communication device, a second target radiation azimuth corresponding to the location information of the first communication device based on the location information of the first communication device, and determining a corresponding second antenna radiation azimuth according to the second target radiation azimuth, to point to the first communication device.

BRIEF DESCRIPTION OF DRAWINGS

In order to clearly illustrate technical features of the embodiments of the present disclosure, the drawings that need to be used in the embodiments of the present disclosure will be briefly described in the following. It is obvious that the described drawings are only related to the embodiments of the present disclosure. Based on the drawings, those skilled in the art may acquire other drawings, without any inventive work.

DETAILED DESCRIPTION

In order to have a clearer understanding of the technical features, objectives, and effects of the present disclosure, the specific implementations of the present disclosure will be further described in detail in conjunction with the accompanying drawings and the embodiments. The following embodiments are only intended to illustrate the present disclosure, but are not intended to limit the scope of protection of the present disclosure. Based on the embodiments in the present disclosure, those skilled in the art may acquire other embodiment(s), without any inventive work, which should be within the scope of the present disclosure.

In the description of the present disclosure, it should be understood that the numbering per se, such as "first", "second", etc., is only used to distinguish the described objects and does not have order or technical meaning, and cannot be understood as specifying or implying the importance of the described objects.

It should be understood that the terms used in the present disclosure are only for the purpose of describing specific embodiments and are not intended to limit the present disclosure. As used in the present disclosure, unless otherwise clearly indicated in the context, singular forms of "a/an", "one" and "the" are intended to include plural forms.

The terms "including" and "comprising" indicate presence of the described features, ensembles, steps, operations, elements, and/or components, but do not exclude presence or addition of one or more other features, ensembles, steps, operations, elements, components, and/or collections thereof.

Figure 1A:
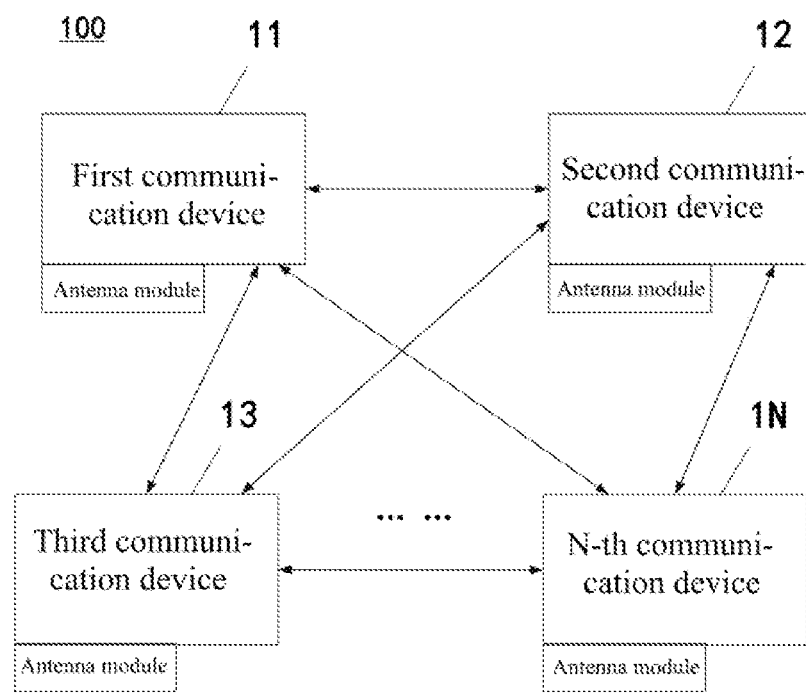
FIG. 1A is a schematic structural diagram of an embodiment of a communication system provided by the present disclosure.

FIG. 1A is a schematic structural diagram of an embodiment of a communication system provided by the present disclosure.

As shown in FIG. 1A, the communication system 100 includes a plurality of communication devices (11, 12, 13 . . . 1N), and the communication devices may communicate with each other pairwise. Each communication device is mounted with an antenna module; and the antenna module may perform transmission required by communication in a plurality of radiation azimuths.

The plurality of communication devices (11, 12, 13 . . . 1N) included in the communication system may be a plurality of user terminals (e.g., clients), a plurality of wireless access points (APs), or a plurality of communication base stations; or of course, may also be other types of communication devices; or types of the plurality of communication devices (11, 12, 13 . . . 1N) may be different, for example, may be any combination of user terminals, wireless access points, and communication base stations.

With respect to one or more communication devices (the communication device 11, the communication device 12, the communication device 13 . . . or the communication device 1N) in the communication system, for example, an antenna module of a first communication device 11 determines a first target radiation azimuth corresponding to location information of a peer communication device, based on the location information of the peer communication device (i.e., a communication object communicating with the current communication device, which thus may also be referred to as the communication object) among the plurality of communication devices (11, 12, 13 . . . 1N).

Optionally, the first communication device may be any communication device in the communication system, and the number of the first communication device(s) may be one or more. Optionally, the number of the peer communication device(s) of each first communication device may also be one or more.

For example, if the first communication device (e.g. the communication device 11) needs to communicate with other two communication devices (e.g. the communication device 12 and the communication device 13), then the two communication devices serve as peer communication devices of the first communication device, and the antenna module of the first communication device may determine location information of the two peer communication devices (e.g., the communication device 12 and the communication device 13) and determine two first target radiation azimuths respectively corresponding thereto. Each (the first or the second) target radiation azimuth may be an ideal radiation azimuth from the antenna module of the current communication device to the antenna module of the peer communication device, for example, an azimuth of a connection line connecting the two communication devices in a three-dimensional coordinate system.

Then, the antenna module of the first communication device (one of the communication device 11, the communication device 12, the communication device 13 . . . or the communication device 1N) determines a corresponding first antenna radiation azimuth based on the first target radiation azimuth corresponding to the location information of the peer communication device (e.g., the other one of the communication device 11, the communication device 12, the communication device 13 . . . or the communication devices 1N), and uses the determined first antenna radiation azimuth to point to the peer communication device, so as to carry out directional communication from the first communication device to the peer communication device.

In the present disclosure, the (first or second) antenna radiation azimuth is the radiation azimuth closest to the (first or second) target radiation azimuth among the plurality of radiation azimuths that is determined according to the directional antenna structure included in the antenna module.

Similarly, since each peer communication device is also mounted with an antenna module, the process may also be carried out similarly.

For example, the antenna module of the peer communication device determines the second target radiation azimuth corresponding to the location information of the first communication device, based on the location information of the first communication device; and the antenna module of the peer communication device determines the second antenna radiation azimuth based on the determined second target radiation azimuth, and uses the determined second antenna radiation azimuth to point to the first communication device, so as to carry out directional communication from the peer communication device to the communication device.

For example, the antenna module of the peer communication device (e.g. 12) of the first communication device (e.g. 11) may determine the location information of the first communication device (e.g. 11), determine the second target radiation azimuth, and further determine the second antenna radiation azimuth corresponding to the second target radiation azimuth.

In addition, the process of each peer communication device of each first communication device determining a second radiation azimuth corresponding to the first communication device may be independent. For example, the first communication device (11) has a first peer communication device (12) and a second peer communication device (13), wherein, during a period when the antenna module of the first peer communication device (12) determines a second antenna radiation azimuth pointing to the first communication device (11), the antenna module of the second peer communication device (13) may also determine a second antenna radiation azimuth pointing to the first communication device.

In some cases, positions of the communication devices for directional communication may all change, so the antenna modules of relevant communication devices need to re-determine antenna radiation azimuths according to updated positions.

Optionally, when location information of at least one of the first communication device and the peer communication device is updated, the first antenna radiation azimuth pointing to the peer communication device that is determined by the antenna module of the first communication device is updated, and the second antenna radiation azimuth pointing to the first communication device that is determined by the antenna module of the peer communication device is updated.

For example, when the location information of the first communication device 11 is updated, the first antenna radiation azimuth pointing to the peer communication device 12 that is determined by the antenna module of the first communication device 11 is updated, and the second antenna radiation azimuth pointing to the first communication device 11 that is determined by the antenna module of the peer communication device 12 is updated. For example, if the position of the first communication device 11 changes, then the relative position of the peer communication device relative to the first communication device will also change. Therefore, the antenna module of the first communication device determines an updated target radiation azimuth from the first communication device to the peer communication device based on the updated relative location information, and further determines an updated first antenna radiation azimuth. With respect to the peer communication device, the process is similar.

Similarly, when the location information of the peer communication device 12 is updated, the first antenna radiation azimuth pointing to the peer communication device 12 that is determined by the antenna module of the first communication device 11 is updated, and the second antenna radiation azimuth pointing to the first communication device 11 that is determined by the antenna module of the peer communication device 12 is updated.

In a case where the first communication device 11 has a plurality of peer communication devices, an operation of an antenna module of every other peer communication device is similar to the operation of the antenna module of the peer communication device 12.

Optionally, an antenna module of each communication device may regularly or periodically determine location information of each peer communication device, thereby updating an associated antenna radiation azimuth, so as to use the updated antenna radiation azimuth to carry out directional communication.

Optionally, with respect to determining location information of each communication device, each communication device may broadcast its own positioning information (e.g., by other means such as GPS), for example, may broadcast regularly or periodically through an antenna module thereof, so that an antenna module of a peer communication device of the communication device may determine the location information of the communication device based on the positioning information. That is, an antenna module of each communication device may include a space positioning module.

Optionally, with respect to determining each antenna radiation azimuth, an antenna module of each communication device may include a directional adjustment algorithm module, so that the target radiation azimuth may be determined based on the location information of the peer communication device that is obtained by the space positioning module, and further a corresponding antenna radiation azimuth may be selected from the plurality of radiation azimuths that are determined according to the directional antenna structure included in the antenna module.

Optionally, an antenna module of each communication device may further include a directional antenna module, and the directional antenna module includes a directional antenna structure, for example, an adaptive antenna array, a directional antenna array, etc. The directional antenna structure may be used to provide N radiation azimuths, which, for example, are implemented through P antennas, where, P and N are integers greater than or equal to 1 and may be the same or different. The P antennas may be directionally adjusted based on the antenna radiation azimuth selected by the directional adjustment algorithm module, to point to the peer communication device. Optionally, each antenna among the P antennas may be a non-omnidirectional antenna (e.g., a directional antenna) or an omnidirectional antenna.

The directional antenna module may include a plurality of directional antenna structures, for example, each antenna structure may be used for directional communication with a peer communication device, so that the communication device may simultaneously perform transmission required by two-way directional communication with a plurality of peer communication devices. Or, the directional antenna module may include only one antenna structure, for example, the antenna structure may be used for transmission required for two-way directional communication with different peer communication devices at different times.

An example structure of the antenna module will be described later with reference to FIG. 2. However, providing the example structure is only to help better understand the present disclosure. Those skilled in the art should understand that the antenna module may adopt other designs, as long as the position determination process, the determination of the positioning antenna radiation azimuth, and the adjustment process of the directional antenna structure as described above may be implemented.

According to another aspect of the present disclosure, there is further provided a communication method of a communication system, and the communication system may be the communication system 100 as described above with reference to FIG. 1A.

Figure 1B:
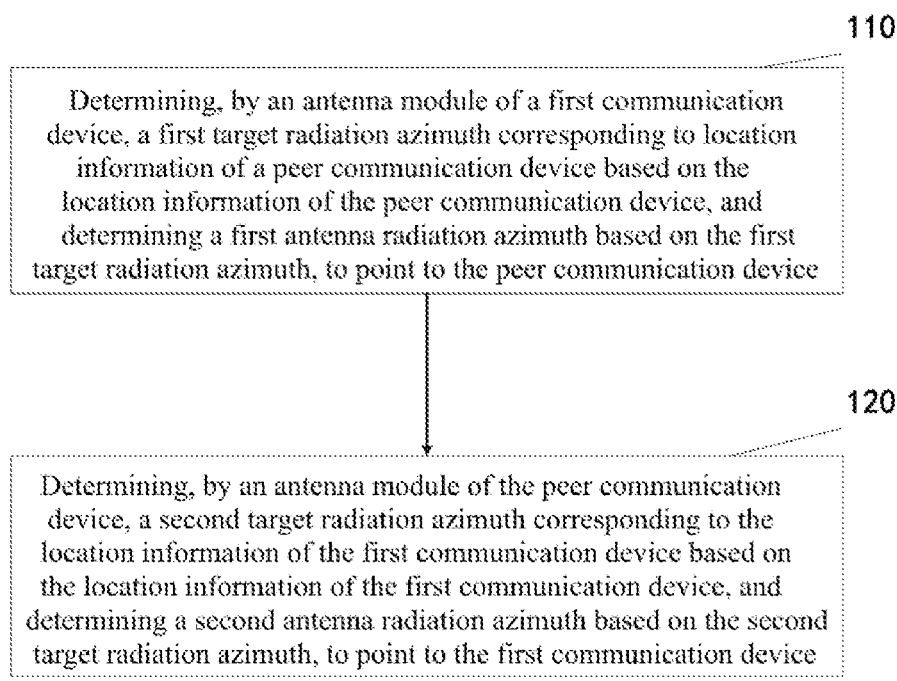
FIG. 1B is a schematic flow chart of an embodiment of a communication method of a communication system provided by the present disclosure.

FIG. 1B shows a schematic flow chart of the communication method.

In Step S110, an antenna module of a first communication device among a plurality of communication devices in the communication system determines a first target radiation azimuth corresponding to location information of a peer communication device based on the location information of the peer communication device among the plurality of communication devices, and determines a corresponding first antenna radiation azimuth according to the first target radiation azimuth, to point to the peer communication device.

For example, the first communication device may be any communication device in the communication system 100.

In Step S120, the peer communication device determines a second target radiation azimuth corresponding to the location information of the first communication device based on the location information of the first communication device, and determines a corresponding second antenna radiation azimuth according to the second target radiation azimuth, to point to the first communication device.

For example, the peer communication device may be any communication device that communicates with the first communication device in the communication system 100.

Further contents of the above-described respective steps may be similar to relevant parts of the communication system described with reference to FIG. 1A and the antenna module described later with reference to FIG. 2 to FIG. 3, so detailed descriptions of the specific content of the respective steps are omitted here.

In the communication system described in FIG. 1A and the communication method described in FIG. 1B, the antenna module of each communication device in the communication system may determine location information of a peer communication device, determine a target radiation azimuth according to the location information, and further determine a corresponding antenna radiation azimuth, and the antenna module may further use the determined antenna radiation azimuth to point to the peer communication device, so that directional transmission may be implemented. The process allows decoupling from the control system of the antenna (the communication device), thus reducing costs of both software and hardware implementation. In addition, each communication device in the communication system may perform such a process based on a mounted antenna module thereof, so directional communication between any two communication devices in a plurality of directions within the communication system may also be implemented, that is, multi-way directional communication may be implemented.

Figure 2:
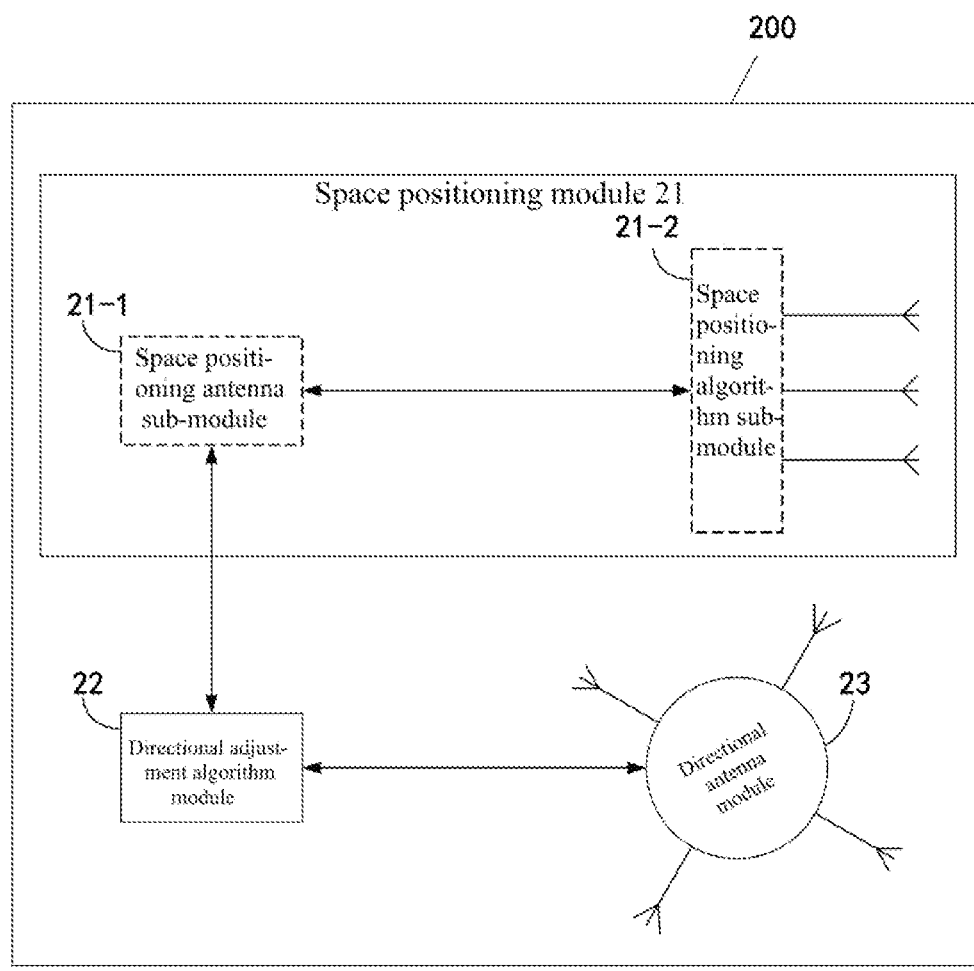
FIG. 2 is a schematic structural diagram of an embodiment of an antenna module provided by the present disclosure.

FIG. 2 shows a schematic structural diagram of an embodiment of an antenna module provided by the present disclosure. The antenna module is mounted onto the communication device.

As shown in FIG. 2, the antenna module 200 may include a space positioning module 21, a directional adjustment algorithm module 22, and a directional antenna module 23.

The space positioning module 21 is configured to determine location information of a peer communication device of the communication device in the three-dimensional coordinate system, based on positioning information acquired from the peer communication device of the communication device.

Optionally, as shown in FIG. 2, as an example, the space positioning module 21 may include a space positioning antenna sub-module 21-1 and a space positioning algorithm sub-module 21-2.

The space positioning antenna sub-module 21-1 may include M positioning antennas configured to receive positioning information from the peer communication device of the communication device, where, M is an integer greater than or equal to 1, and each positioning antenna may include a plurality of antenna branches. The space positioning antenna sub-module 21-1 may transmit the positioning information to the space positioning algorithm sub-module 21-2, optionally, the M positioning antennas are arranged on a different spatial plane, and a distance between any two positioning antennas is within half a wavelength.

The space positioning algorithm sub-module 21-2 may be configured to establish a three-dimensional coordinate system with a center of the M positioning antennas as an origin, and determine a three-dimensional coordinate as the location information of the peer communication device of the communication device in the three-dimensional coordinate system according to the positioning information.

Optionally, the space positioning algorithm sub-module 21-2 may calculate distance information of the peer communication device relative to each positioning antenna of the antenna module and phase difference information for the timing information received by any two antennas according to the positioning information, determine the three-dimensional coordinate of the peer communication device in the three-dimensional coordinate system according to the distance information and the phase difference information, and transmit the three-dimensional coordinate to the directional adjustment algorithm module 22.

In addition, the directional adjustment algorithm module 22 may be configured to determine a target radiation azimuth corresponding to the peer communication device based on the location information of the peer communication device in the three-dimensional coordinate system, and select an antenna radiation azimuth from N radiation azimuths, based on the determined target radiation azimuth, where, N is an integer greater than or equal to 1. Optionally, the directional adjustment algorithm module 22 may provide selection information of the antenna radiation azimuth to the directional antenna module 23.

The directional antenna module 23 may include a directional antenna structure capable of providing the N radiation azimuths, so that the directional antenna structure may be directionally adjusted based on the antenna radiation azimuth selected by the directional adjustment algorithm module to point to the peer communication device.

Optionally, as shown in FIG. 2, as an example, the directional antenna structure included in the directional antenna module 23 may be based on an adaptive antenna array or a directional antenna array. For example, the directional antenna structure may include P antennas for receiving the antenna radiation azimuth selected by the directional adjustment algorithm module, and directionally adjusting the P antennas according to the antenna radiation azimuth, where, P>0, a radiation field of the P antennas covers the entire three-dimensional space. P may be equal or unequal to the number N of radiation azimuths. For example, based on the P antennas, the three-dimensional space may be divided into N radiation spaces by sector, where, a direction with the maximum main wave gain in each radiation space is a radiation azimuth, so that N radiation azimuths may be obtained. However, a specific implementation of the directional antenna structure will not be limited in the present disclosure, as long as N radiation azimuths may be formed. Optionally, each antenna among the P antennas may be a non-omnidirectional antenna (e.g., a directional antenna) or an omnidirectional antenna.

In the antenna module 1, the space positioning antenna sub-module 21-1 of the space positioning module 21 is connected with the space positioning algorithm sub-module 21-2, the space positioning algorithm sub-module 21-2 is connected with the directional adjustment algorithm module 22, and the directional adjustment algorithm module 22 is connected with the directional antenna module 23. The term "connection" should be construed in its broad sense, for example, "connection" may be fixed connection, or detachable connection, or integral connection; or may also be mechanical connection or electrical connection, or a communication; it may also be direct connection, or may also be indirect connection through an intermediate medium; or may also be internal communication between two components or an interaction relationship between two components. It will be understood by those ordinarily skilled in the art that the specific meanings of the above terms vary in different contexts.

Specifically, the antenna module is mounted on the communication device. After energization, a three-dimensional coordinate system is firstly established with the space positioning antenna sub-module 21-1 as an origin. When positioning the peer communication device, firstly the positioning antennas of the space positioning antenna sub-module 21-1 respectively receive the positioning information broadcasted by the peer communication device, where the positioning information has a timestamp, and transmit the positioning information to the space positioning algorithm sub-module.

The space positioning algorithm sub-modules 21-2 may calculate distance information and phase information of the peer communication device relative to the respective positioning antennas according to the received positioning information, and further determine the three-dimensional coordinate (x, y, z) of the peer communication device in the three-dimensional coordinate system, that is, obtain the position of the communication object, and then transmit the three-dimensional coordinate (x, y, z) to the directional adjustment algorithm module 22.

The directional antenna module divides the three-dimensional space into N radiation azimuths $(\alpha,\beta)\_n$ by sector. The greater the value of N, the finer the division of the three-dimensional space, and the better the effect of directional communication. After receiving the three-dimensional coordinate (x, y, z), the directional adjustment algorithm module 22 may uniquely convert the three-dimensional coordinate (x, y, z) into the corresponding target radiation azimuth $(\alpha,\beta)$ according to the corresponding relationship of the three-dimensional coordinate system, and determine the antenna radiation azimuth $(\alpha,\beta)\_n$ based on the target radiation azimuth $(\alpha,\beta)$ to transmit the same to the directional antenna module 23.

After receiving the antenna radiation azimuth $(\alpha,\beta)\_n$, the directional antenna module 23 performs directional adjustment on the directional antenna structure, to control the directional antenna structure to operate at the antenna radiation azimuth $(\alpha,\beta)\_n$.

While positioning the peer communication device of the communication device, the antenna module is further capable of broadcasting positioning information to the outside world for the peer communication device to position the communication device, so as to implement two-way positioning. Moreover, the above-described positioning process may be carried out between a plurality of communication devices. For example, the positioning information broadcasted by the communication device 11 in FIG. 1 may be received by the peer communication device 12 and the peer communication device 13, for the peer communication device 12 and the peer communication device 13 to position the communication device 11. Therefore, multi-way positioning may also be implemented.

It should be noted that the antenna module is an independent system and may be mounted on any communication device that requires an antenna for application, for example, a user terminal, a communication base station, an AP, etc. When any two communication devices communicating with each other are both mounted with the antenna module according to the present disclosure, two-way positioning may be implemented between the two communication devices.

The present disclosure provides an antenna module mounted onto a communication device, which determines a position of a peer communication device through wireless positioning technology, and is capable of improving positioning accuracy, and implementing precise and stable directional antenna adjustment; meanwhile, the antenna module has transmission and reception functions, and is capable of implementing two-way (multi-way) positioning and further implementing two-way (multi-way) directional communication; in addition, the antenna module is independent of the communication device per se, and is decoupled from the communication device, without management and control of the communication device, which reduces design difficulties and costs of the communication device.

In a preferred embodiment, the positioning information is a wireless data message with a timestamp.

It may be understood that a signal form and a modulation mode of the positioning information may be set according to actual situations, as long as each pair of communication devices are ensured to have a same signal form and a same modulation mode, and may recognize each other.

In a preferred embodiment, the space positioning algorithm sub-module 21-2 determines the three-dimensional coordinate of the peer communication device in the three-dimensional coordinate system specifically through steps below:

Calculating transmission time of positioning information according to the timestamp in the positioning information received by each positioning antenna, and respectively calculating distance information of the peer communication device relative to each positioning antenna, in combination with the transmission speed of the positioning information;

Calculating phase difference information between positioning information (e.g., positioning signal) received by any two positioning antennas, the phase difference information being associated with a position relationship of the M positioning antennas; and Determining the three-dimensional coordinate of the peer communication device in the three-dimensional coordinate system according to a trigonometric function relationship, based on the distance information of the peer communication device relative to each positioning antenna and the phase difference information between the positioning information received by any two positioning antennas.

Specifically, when the peer communication device broadcasts positioning information, a timestamp is added to the positioning information, the antenna module of the communication device respectively receives the positioning information through the positioning antennas, then calculates time of flight (TOF) of the positioning information in the air according to the timestamp in the positioning information, and multiply the time of flight by the flight speed t of the positioning information in the air, so that a distance between each positioning antenna and the peer communication device may be respectively calculated.

Meanwhile, since there are layout distances between respective positioning antennas, and positioning information of the peer communication device in a same position remains unchanged, there are differences in phases of the positioning information reaching different positioning antennas (wherein, the positioning information has a direct-transmission path, a diffraction path, and a refraction path in the propagation process, and what is referred to here is a direct-transmission path), and then a phase-difference-of-arrival (PDOA) of positioning information received by any two antennas may be calculated.

After the distance information and the phase information are obtained, the three-dimensional coordinate of the peer communication device may be calculated according to the trigonometric function relationship in the established three-dimensional coordinate system.

In a preferred embodiment, when determining the antenna radiation azimuth, the directional adjustment algorithm module 22 is specifically configured to:

Convert the three-dimensional coordinate of the peer communication device in the three-dimensional coordinate system that is received from the space positioning module 21 into the target radiation azimuth;

Compare the target radiation azimuth with the N pre-divided radiation azimuths, and determine the radiation azimuth among the N radiation azimuths that is closest to the target radiation azimuth as the antenna radiation azimuth.

Optionally, the three-dimensional coordinate is in a form of point coordinate; and the target radiation azimuth and the N radiation azimuths are in a form of the angle coordinate.

In a preferred embodiment, the directional adjustment algorithm module 22 converts the three-dimensional coordinate into the target radiation azimuth.

Besides, in order to determine the antenna radiation azimuth, the directional adjustment algorithm module 22 may be further configured to:

Pre-divide the three-dimensional coordinate system into N radiation azimuths corresponding to the directional antenna module 23 in the form of angle coordinate, according to the directional antenna structure included in the directional antenna module 23.

Specifically, the three-dimensional coordinate (x, y, z) is acquired by the space positioning module 21 (which is specifically the space positioning antenna sub-module 21-1); in the three-dimensional coordinate system, the entire three-dimensional space is divided into N radiation azimuths in the form of angle coordinate (horizontal angle, elevation angle). The specific implementation will not be limited, for example, P antennas are used to divide the space into N small-angle sectors, and a direction with the maximum main wave gain in each small-angle sector is taken as a radiation azimuth. Other smart antennas, adaptive antenna arrays, etc. may also be used. Each radiation azimuth corresponding to the directional antenna module 23 is represented as $(\alpha,\beta)\_n$ in the three-dimensional coordinate system, and thus an array of radiation azimuths may be obtained.

Optionally, the directional antenna module 23 may also pre-divide the three-dimensional coordinate system into the above-described N radiation azimuths in the form of angle coordinate, and supply the information of the divided N radiation azimuths to the directional adjustment algorithm module 22.

According to the corresponding relationship of the three-dimensional coordinate, as shown in FIG. 2, the three-dimensional coordinate (x, y, z) may be converted into the corresponding accurate target radiation azimuth $(\alpha,\beta)$.

The target radiation $(\alpha,\beta)$ azimuth is compared with $(\alpha,\beta)\_n$, to obtain a value closest to the target radiation azimuth $(\alpha,\beta)$; a radiation azimuth corresponding to the closest value is determined as the antenna radiation azimuth, and the information of the determined antenna radiation azimuth is transmitted to the directional antenna module 23.

For example, in a case where the directional antenna structure includes P antennas, the target radiation azimuth $(\alpha,\beta)$ may be compared with $(\alpha,\beta)\_n$, to obtain a value closest to the target radiation azimuth $(\alpha,\beta)$; the antenna(s) associated with the radiation azimuth corresponding to the closest value may be determined as the target antenna(s) (whose radiation azimuth formed is the same as the above-described antenna radiation azimuth); and the information of the determined target antenna(s) may be transmitted to the directional antenna module 23.

Correspondingly, the directional antenna module 14 is specifically configured to:

Receive from the directional adjustment algorithm module 22 information about the antenna radiation azimuth or the target antenna, directionally adjusts the directional antenna structure according to the information about the antenna radiation azimuth or the target antenna, controls the directional antenna structure to operate on the antenna radiation azimuth, and thus is capable of implementing the multi-way directional communication.

In a preferred embodiment, in a case where the directional antenna structure includes P antennas, the three-dimensional space may be divided into N radiation spaces by sector based on the P antennas, where, a direction with the maximum main wave gain in each radiation space is one radiation azimuth, so that N radiation azimuths may be obtained. The direction with the maximum main wave gain in the antenna radiation field is uniquely identified as the radiation azimuth, so that the radiation azimuth of the directional antenna may be quickly and conveniently determined.

Furthermore, it should be noted that although the above-described respective modules and sub-modules are shown in an exemplary manner, it should be understood that functions of respective modules or sub-modules may also be recombined according to different functions, the antenna module may further be divided into more or fewer modules, or each module may be further divided into more or fewer sub-modules. At least some of the respective modules, i.e., the space positioning module 21 (e.g., including the space positioning antenna sub-module 21-1, the space positioning algorithm sub-module 21-2), the directional adjustment algorithm module 22, or the directional antenna module 23 as mentioned in the present disclosure may be implemented by electronic hardware (e.g., a general-purpose processor, a digital signal processor (DSP), an application specific integrated circuit (ASIC), a field programmable gate array (FPGA) or other programmable logic device, a discrete gate or a transistor logic device, and a discrete hardware component, etc.), and computer software (e.g., which may be stored in a random access memory (RAM), a flash memory, a read only memory (ROM), an erasable programmable ROM (EPROM), etc.), or a combination of both.

A specific operation flow of the antenna module provided by the present disclosure is as follows:

S10: transmitting positioning information to the outside world and/or receiving positioning information from the outside world;

S20: determining location information of the peer communication device according to the positioning information of the outside world;

S30: controlling a direction in which the radiation azimuth of the directional antenna points to the peer communication device.

It should be understood that the specific operation flow of the antenna module and the communication method as described above may also be completed in the present disclosure by instructing relevant hardware through computer programs. The computer programs may be stored in a computer-readable storage medium, and when executed by the processor, the computer programs may implement the specific operation flow of the above-described antenna module. The computer programs include computer program codes, the computer program codes may be in the form of source codes, object codes, executable files, or some intermediate forms, etc. The computer-readable medium may include: any entity or apparatus capable of carrying the computer program codes, a record medium, a USB flash drive, a portable hard drive, a magnetic disc, an optical disc, a computer memory, a read-only memory (ROM), a random access memory (RAM), an electrical carrier signal, a telecommunications signal, and a software distribution medium, etc. It should be noted that the content contained in computer-readable media may be appropriately increased or decreased according to requirements of legislation and patent practice in the jurisdiction. For example, in some jurisdictions, according to legislation and patent practice, the computer-readable media do not include an electrical carrier signal and an electrical signal.

Correspondingly, the present disclosure further provides a communication device; and the communication device includes the antenna module according to any one of the above-described embodiments.

Specifically, the communication device may be a user terminal device, a communication base station, an AP, etc., or other devices that require the use of antennas.

Figure 3:
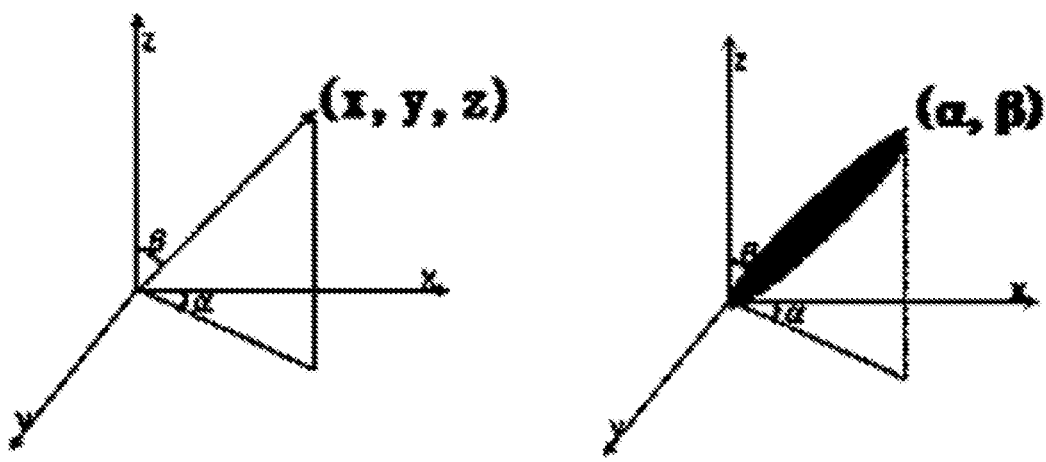
FIG. 3 is a schematic diagram of an embodiment of converting a three-dimensional coordinate to a target radiation azimuth.

Correspondingly, as a specific example of a communication system (as shown in FIG. 1) including a plurality of communication devices adopting the antenna module shown in FIG. 2 to FIG. 3, the communication system may include a communication base station (also briefly referred to as a base station) and a client.

At this time, an operation flow of the entire communication system is:

1. Firstly, based on the "space positioning antenna sub-module" in the "space positioning module", the antenna module of the communication base station establishes a three-dimensional coordinate system. "STA_Position" represents an azimuth point of the client in the coordinate system, and the three-dimensional coordinate of the azimuth point is (x, y, z);

A radiation azimuth map of the directional antenna structure is simultaneously established in the above-described three-dimensional coordinate system, namely, "ANT_Position", which is azimuth point information in the same three-dimensional coordinate system, and thus may have a one-to-one corresponding relationship established with "STA_Position".

2. The communication base station side acquires the azimuth point information of the client: the space positioning module positions the "azimuth point" information of the associated client through its own space positioning algorithm and the space positioning antenna, and writes the same into a "STA_Position" azimuth point information table;

The "STA_Position" information is synchronized to the directional adjustment algorithm module of the antenna module. The directional adjustment algorithm module obtains a transformed target radiation azimuth having a same form of coordinate as the radiation azimuth "ANT_Position" according to the one-to-one corresponding relationship of the three-dimensional coordinate system, and corresponds the same to the closest radiation azimuth ANT_Position information. Then the directional antenna module performs directional adjustment on the directional antennas, to implement precise directional transmission from the base station to the client.

3. The client side acquires the azimuth information of the communication base station: since both sides each have an antenna module, the client may also acquire the azimuth point information of the communication base station, and may also implement precise directional transmission from the client to the base station through a same operation.

The client may be a multi-client side, and there may also be a plurality of communication base stations.

Thus it can be seen that the base station and the client each have an antenna module mounted thereon, and the two antenna modules are the same and may exchange roles. The operation of the client is exactly the same as that of the communication base station, to complete directional antenna adjustment on the client, so that two-way directional communication between the base station and the client may be completed.

4. Case of position change of the communication base station and the client:

In case of position change of the communication base station and the client, the acquired client STA_Position will change, which is rewritten into the azimuth point information table; and thereafter, the two-way directional communication mechanism will continue to be established.

Or, as another specific example of a communication system (as shown in FIG. 1) including a plurality of communication devices adopting the antenna module shown in FIG. 2 to FIG. 3, the communication system may include a first communication device (main route AP1) and a second communication device (child route AP2), thereby forming a MESH network.

At this time, an operation flow of the entire communication system includes:

1. After AP1 and AP2 are mounted, positions thereof are fixed, and AP1 and AP2 are wirelessly connected with each other to form a MESH.

2. Based on the "space positioning antenna sub-module" in the space positioning module of the antenna module on AP1, a three-dimensional coordinate system is established;
3. AP1 maps information of respective azimuth points in the radiation field of the directional antenna structure included in the directional antenna module thereof onto the above-described three-dimensional coordinate system, and records the same as a plurality of "Position_ant";
4. Using the "space positioning algorithm sub-module" in the space positioning module of the antenna module, AP1 positions an azimuth point of AP2 in the coordinate system, and records the same as "Position_son1". "Position_son1" and "Position_ant" have a corresponding relationship since they belong to a same coordinate system;
5. After the above-described steps, AP1 acquires a precise azimuth of child AP2, AP1 adjusts the radiation azimuth to point to child AP2 through the "positioning adjustment algorithm module" and the "directional antenna module".
6. With respect to AP2, the above-described steps (2) to (5) are performed similarly, so that the antenna radiation azimuth may be pointed to AP1.

Afterwards, the MESH system (AP1 and AP2) may implement precise two-way directional backhaul communication.

Of course, as descried above, the MESH network may include more child route APs, allowing for two-way directional backhaul communication between AP1 and each child route AP among more child route APs simultaneously or in a time-sharing manner (depending on the number of directional antenna structures).

The above is only a preferred implementation of the present disclosure. But the scope of protection of the present disclosure is not limited thereto. It should be pointed out that for those skilled in the art, several obvious equivalent variations and/or equivalent replacement modes may be made without departing from the principles of the present disclosure. These obvious equivalent variations and/or equivalent replacement modes should also be considered as the scope of protection of the present disclosure.

The invention claimed is:

1. A communication system, comprising a plurality of communication devices, wherein:
   an antenna module of a first communication device among the plurality of communication devices in the communication system determines a first target radiation azimuth corresponding to location information of a peer communication device among the plurality of communication devices based on the location information of the peer communication device, and determines, from N radiation azimuths corresponding to the antenna module of the first communication device, a corresponding first antenna radiation azimuth according to the first target radiation azimuth, to point to the peer communication device, where, N is an integer greater than or equal to 1; and
   an antenna module of the peer communication device determines a second target radiation azimuth corresponding to the location information of the first communication device based on the location information of the first communication device, and determines, from N1 radiation azimuths corresponding to the antenna module of the peer communication device, a corresponding second antenna radiation azimuth according to the second target radiation azimuth, to point to the first communication device, where, N1 is an integer greater than or equal to 1.

2. The communication system according to claim 1, wherein, a number of the first communication device is one or more, and/or a number of the peer communication device of the first communication device is one or more.

3. The communication system according to claim 1, wherein, the plurality of communication devices comprised by the communication system comprise one of:
   a plurality of user terminals;
   a plurality of wireless access points;
   a plurality of base stations; or
   any combination of user terminals, wireless access points, and base stations.

4. The communication system according to claim 1, wherein, the peer communication device comprises a first peer communication device and a second peer communication device,
   an antenna module of the first peer communication device and an antenna module of the second peer communication device independently determine second antenna radiation azimuths respectively pointing to the first communication device.

5. The communication system according to claim 1, wherein, when location information of at least one of the first communication device and the peer communication device is updated,
   the first antenna radiation azimuth pointing to the peer communication device that is determined by the antenna module of the first communication device is updated; and
   the second antenna radiation azimuth pointing to the first communication device that is determined by the antenna module of the peer communication device is updated.

6. The communication system according to claim 1, wherein, the antenna module of the first communication device comprises:
   a space positioning module, configured to determine the location information of the peer communication device in a three-dimensional coordinate system, based on positioning information acquired from the peer communication device of the first communication device;
   a directional adjustment algorithm module, configured to determine a target radiation azimuth corresponding to the peer communication device based on the location information of the peer communication device in the three-dimensional coordinate system, and select an antenna radiation azimuth from the N radiation azimuths, based on the determined target radiation azimuth; and
   a directional antenna module, comprising a directional antenna structure providing the N radiation azimuths, and configured to directionally adjust the directional antenna structure based on the antenna radiation azimuth selected by the directional adjustment algorithm module to point to the peer communication device.

7. The communication system according to claim 6, wherein, the space positioning module comprises:
   a space positioning antenna sub-module, comprising M positioning antennas, and configured to receive the positioning information from the peer communication device of the first communication device, where, M is an integer greater than or equal to 1;
   a space positioning algorithm sub-module, configured to establish the three-dimensional coordinate system with a center of the M positioning antennas as an origin, and determine a three-dimensional coordinate as location information of the peer communication device in the three-dimensional coordinate system according to the positioning information.

8. The communication system according to claim 7, wherein, when determining the antenna radiation azimuth, the directional adjustment algorithm module is configured to:
   convert the three-dimensional coordinate of the peer communication device in the three-dimensional coordinate system into the target radiation azimuth;
   compare the target radiation azimuth with the N radiation azimuths; and
   determine the radiation azimuth among the N radiation azimuths that is closest to the target radiation azimuth as the antenna radiation azimuth.

9. The communication system according to claim 7, wherein, the directional antenna structure comprises P antennas, and the P antennas are used to form the N radiation azimuths, where, the number P is equal or unequal to the number N.

10. A communication method of the communication system according to claim 1, comprising:
   determining, by an antenna module of a first communication device among a plurality of communication devices in the communication system and from N radiation azimuths corresponding to the antenna module of the first communication device, a first target radiation azimuth corresponding to location information of a peer communication device among the plurality of communication devices based on the location information of the peer communication device, and determining a corresponding first antenna radiation azimuth according to the first target radiation azimuth, to point to the peer communication device, where, N is an integer greater than or equal to 1; and
   determining, by an antenna module of the peer communication device and from N1 radiation azimuths corresponding to the antenna module of the peer communication device, a second target radiation azimuth corresponding to the location information of the first communication device based on the location information of the first communication device, and determining a corresponding second antenna radiation azimuth according to the second target radiation azimuth, to point to the first communication device, where, N1 is an integer greater than or equal to 1.

* * * * *